W. YOUNG.
BRACE FOR AUXILIARY VEHICLE SPRINGS.
APPLICATION FILED MAR. 1, 1909.

966,510. Patented Aug. 9, 1910.
2 SHEETS—SHEET 1.

Witnesses:
J. Waldo Chrisinger.
Odna J. Gockel.

Inventor:
William Young,
By Hugh N. Wagner
His Attorney.

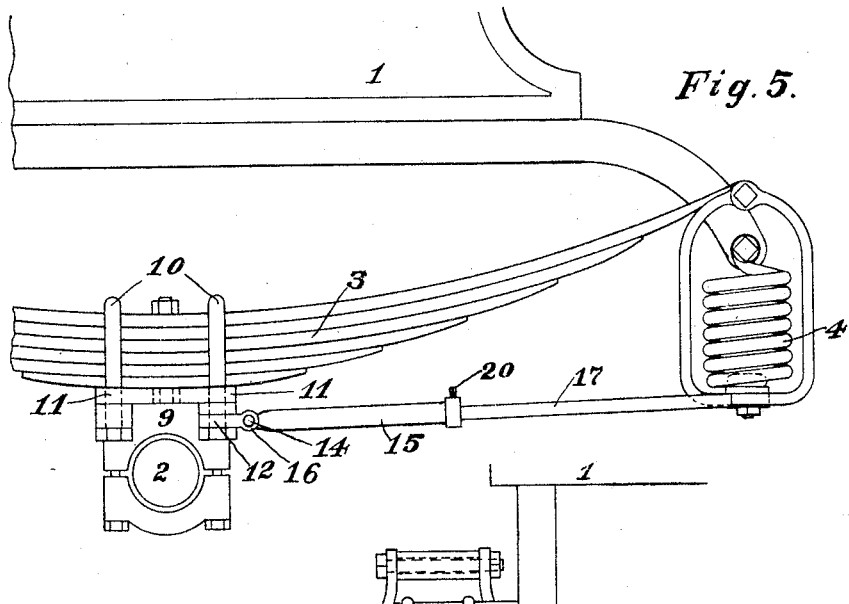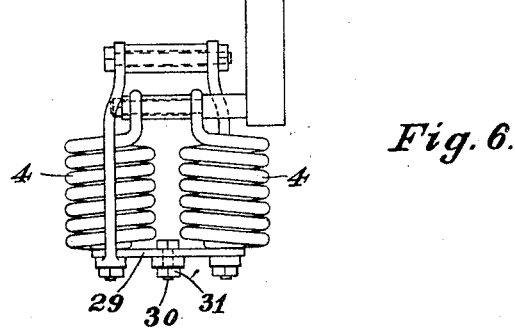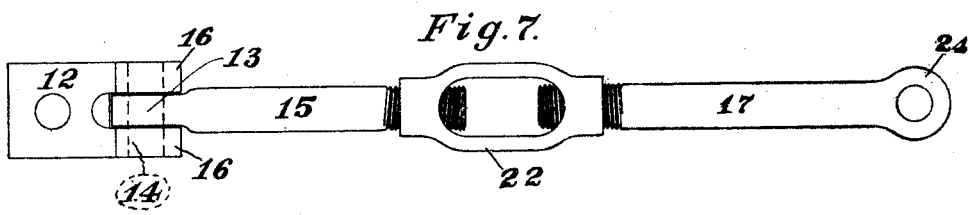

UNITED STATES PATENT OFFICE.

WILLIAM YOUNG, OF ST. LOUIS, MISSOURI, ASSIGNOR TO SUPPLEMENTARY SPIRAL SPRING COMPANY, OF ST. LOUIS, MISSOURI, A CORPORATION OF MISSOURI.

BRACE FOR AUXILIARY VEHICLE-SPRINGS.

966,510.  Specification of Letters Patent.  Patented Aug. 9, 1910.

Application filed March 1, 1909. Serial No. 480,619.

*To all whom it may concern:*

Be it known that I, WILLIAM YOUNG, a citizen of the United States, residing at the city of St. Louis, State of Missouri, have invented certain new and useful Improvements in Braces for Auxiliary Vehicle-Springs, of which the following is a specification, reference being had therein to the accompanying drawings.

This invention consists in an improved brace or steadying device for auxiliary or supplementary vehicle springs, and is particularly intended for use in connection with springs of the kind described in the patent granted to Samuel Furmidge December 19, 1905, No. 807,612.

The present improvements relate particularly to that form of steadying device or brace described in my Patent No. 901,578, dated October 20, 1908.

Figure 1:
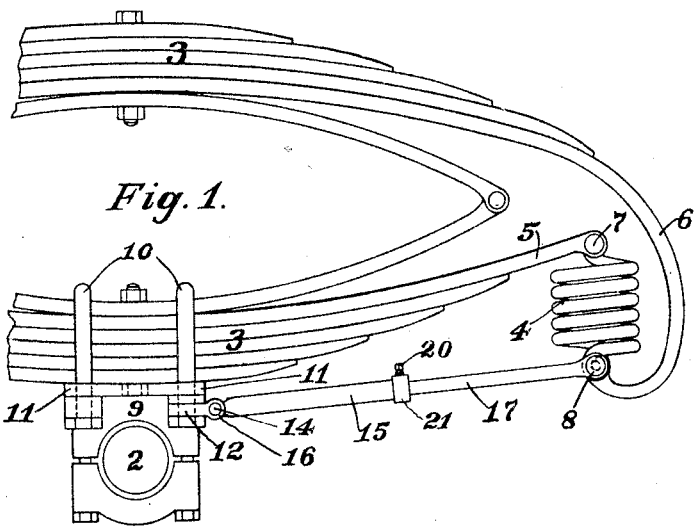
Figure 2:
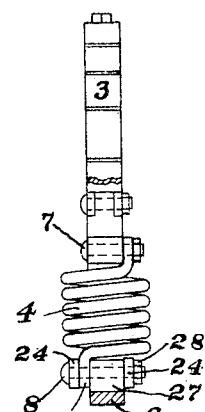
Figure 3:
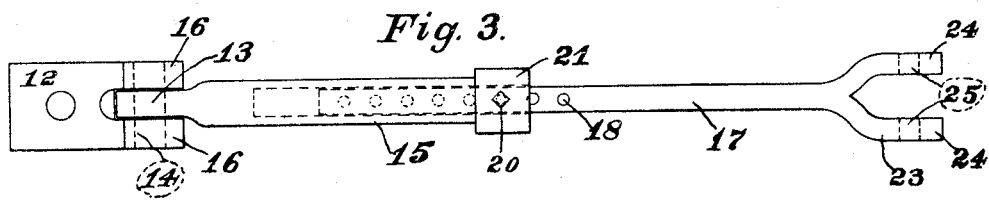
Figure 4:
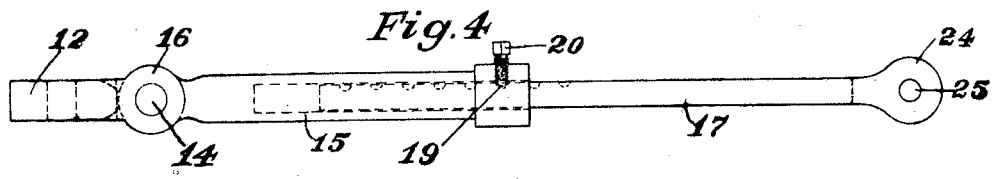

In the drawings forming part of this specification, like numbers of reference denote like parts wherever they occur, and Figure 1 is a side elevation; Fig. 2 is a rear elevation; Fig. 3 is a top plan view of one form of this device; Fig. 4 is a top plan view of a modification thereof; Fig. 5 is a side elevation showing the device of Fig. 4 in use; Fig. 6 is a rear elevation of the same; and Fig. 7 shows a modification of the means for lengthening and shortening the brace rod.

Intermediate the vehicle body 1 and axle 2 is interposed a leaf spring 3, which may be in the form of a full elliptic spring, as is shown in Fig. 1, or, the necessary changes being made, may be a semi-elliptic spring.

In the form illustrated in Fig. 1, the auxiliary or supplementary vehicle spring 4 is attached to leaves 5 and 6 of the leaf spring 3 by means of bolts 7 and 8. The leaf spring 3 rests on spring-pocket 9, and is attached thereto by bolts 10, which run through openings in flanges 11 thereof. One of said bolts 10 passes, also, through an opening through plate 12, having an eye 16 formed thereon to receive pintle 14 attaching same to rod 15 provided with eye 13.

In the preferred form, the rod 15 is hollow, and telescopes rod 17, which contains a recess or recesses 18 or notches adapted to receive the point 19 of set-screw 20 which passes through the wall of hollow rod 15, preferably at this point thickened to form collar 21, and, by its point fitting into one of the notches 18, holds rods 15 and 17 in fixed relation to each other, but allows longitudinal adjustment of one relative to the other, so as to lengthen or shorten the brace formed of said two rods. A series of notches or recesses 18 being provided, said rods can be locked at any desired point to form a brace of length suitable for any position or environment.

In the form shown in Fig. 7, the adjustability of the two rods forming the brace so that said brace may be lengthened or shortened is secured by the introduction of turnbuckle 22 therebetween.

Figs. 3 and 4 illustrate, respectively, the preferred form of end for rod 17 by means of which same is attached either to a single helical spring or a pair of same. In other words, when the auxiliary spring consists of a single helical spring, as shown in Figs. 1 and 2, rod 17 will be provided with the forked end 23 shown in Fig. 3, but when the auxiliary spring consists of a pair of helical springs, as shown in Figs. 5 and 6, the eye 24 on the end of rod 17 will preferably be substituted for the fork 23, although such substitution is not absolutely necessary.

When fork 23 on the end of rod 17 is used, bolt 8 passes through perforations 25 in the prongs of said fork 23, and, as shown in Fig. 2, passes, first, through one of said prongs, then, through eye 26 on helical spring 4, then, through eye 27 on leaf spring 6, then, through the opposite prong of fork 23, and is fastened in place by nut 28. When a pair of helical springs constitutes the supplementary spring, same are preferably united by a connector 29 having a perforation therethrough. A bolt 30 passes through said perforation and through eye 24 on rod 17, and is fastened in place by nut 31.

The swiveling of plate 12 to rod 15 by means of eyes 13 and 16 and pintle 14 allows of accommodation of the brace to the rise and fall of the vehicle, and prevents crystallization (by reason of vibration) of the metal of rod 15 adjacent the point of swiveling.

The advantage of using fork 23 instead of a mere eye on the end of rod 17 is that one-sided strain on helical spring 4 is thus prevented.

It will be evident that many minor changes may be made in the form, arrangement, and mechanical details of the several parts of this device without departing from the spirit of this invention as set forth in the following claims.

I claim:

1. In a device of the character described, the combination of a vehicle body, a main spring of the leaf variety, an auxiliary spring of the helical type, a brace attached to a brace point, and means for attaching said brace to said helical spring consisting in a forked end for said brace and a bolt passing through eyes in said fork and said helical spring, one prong of said fork lying adjacent to one side of said helical spring and the other prong thereof lying adjacent the other side of said helical spring.

2. In combination with a main spring of leaf type, an auxiliary spring of helical type, means for supporting the upper end of said helical spring from said leaf spring, means for supporting the lower end of the spring from a second part of the leaf spring, and bracing means secured at one end to a bracing point and secured at its opposite end at the point of juncture between the second part of the leaf spring and the lower end of the helical spring.

3. In combination with a main spring of leaf type, an auxiliary spring of helical type, said helical spring being interposed between and secured to an upper and a lower part of said leaf spring, a bracing rod, means for pivotally supporting said rod from a suitable bracing point, and means for pivotally securing said rod to the lower end of said helical spring.

4. In combination with a main spring, and an auxiliary spring, a brace rod, means for pivotally supporting said rod from a suitable bracing point, and means for pivotally connecting said rod to the lower end of said auxiliary spring.

5. In combination with a main spring of the leaf variety, a helical spring having a depending relation with respect to the bottom side of the leaf spring and being arranged for coöperation with said main spring, means for supporting the upper end of said helical spring, means for supporting the lower end of the helical spring directly from the main spring, and a brace supported at one end from a bracing point and being disposed approximately parallel to the axis of the leaf spring, and at its opposite end being connected at the juncture of the lower end of the helical spring with its supporting means.

6. In combination with a main spring of the leaf variety, and an auxiliary spring of the helical type, having connection with said leaf spring, a brace having one end secured to a brace point and having its opposite end forked, said forked end of the brace embracing the lower extremity of the helical spring and that portion of the leaf spring where connected to the helical spring, and a bolt passed through eyes provided therefor in the fork, in the lower extremity of the helical spring and the said portion of the leaf spring.

7. In combination with a main spring of the leaf type, and an auxiliary spring of the helical type related thereto, a brace having one end secured to a brace point and having its opposite end forked, said forked end of the brace extending on opposite sides of an end portion of the leaf spring, a bolt passed through eyes provided therefor in said end portion of the leaf spring and said fork of the brace and also passed through an eye provided for the reception of the bolt in one end of the helical spring.

8. In a device of the type set forth, a spring pocket, a leaf spring supported by said pocket, a helical spring pivotally suspended from said leaf spring to coöperate therewith, a plate projecting outwardly from said spring pocket, and a brace rod pivoted to said plate and being directly pivoted to the lower end of said helical spring.

9. In a device of the type set forth, in combination with the axle, a spring pocket secured to the axle, an element projecting outwardly from the pocket, a leaf spring seated in the pocket, a helical spring, means for pivotally suspending said helical spring from its upper end, means pivotally connected to the helical spring, for supporting the base thereof, and bracing means pivotally connected at one end to said outwardly projecting element and pivotally connected at its opposite end to the point of juncture between the helical spring and the supporting means.

10. In combination with a leaf spring, having two leaves arranged in spaced relation, a helical spring interposed in said space and connected to each of said leaves, and bracing means connected at the juncture of the lower end of the helical spring, and the leaf connected to said lower end of said helical spring.

11. In a device of the type set forth, in combination with the axle, a spring pocket secured to the axle, an element projecting outwardly from the pocket at one side thereof, a leaf spring seated in the pocket, a helical spring, means for pivotally suspending said helical spring from its upper end so that it underlies the outer end of the leaf spring, means connected to the helical spring for supporting the base thereof, and bracing means pivotally connected at one end to said outwardly projecting element and connected at its opposite end to the point of juncture between the helical spring and the supporting means.

In testimony whereof I have affixed my signature in presence of two witnesses.

WILLIAM YOUNG.

Witnesses:
GLADYS WALTON,
EDNA J. GOCKEL.